(12) United States Patent
Hamadou et al.

(10) Patent No.: US 10,664,996 B2
(45) Date of Patent: May 26, 2020

(54) METHOD AND APPARATUS FOR THE START-UP OPERATION OF A MULTI-AXIS SYSTEM

(71) Applicant: SIEMENS AKTIENGESELLSCHAFT, München (DE)

(72) Inventors: Mehdi Hamadou, Erlangen (DE); Jan Richter, Lauf an der Pegnitz (DE); Maximilian Walter, Nürnberg (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 188 days.

(21) Appl. No.: 15/818,397

(22) Filed: Nov. 20, 2017

(65) Prior Publication Data

US 2018/0144503 A1    May 24, 2018

(30) Foreign Application Priority Data

Nov. 21, 2016    (EP) ..................... 16199732

(51) Int. Cl.
*G06K 9/00*    (2006.01)
*G06T 7/80*    (2017.01)
(Continued)

(52) U.S. Cl.
CPC .............. *G06T 7/80* (2017.01); *B25J 9/1692* (2013.01); *G06T 7/60* (2013.01); *G06T 7/73* (2017.01);
(Continued)

(58) Field of Classification Search
CPC .... G06T 7/80; G06T 7/74; G06T 7/73; G06T 7/60; G06T 11/60; G06T 2207/30204;
(Continued)

(56) References Cited

U.S. PATENT DOCUMENTS 8,108,119 B2 *   1/2012   Southall .................... B60T 7/22
                                                    382/103
9,722,628 B2     8/2017   Richter et al.
(Continued)

FOREIGN PATENT DOCUMENTS

CN    101297756 A    11/2008
CN    101582161 A    11/2009
(Continued)

*Primary Examiner* — Jonathan S Lee
(74) *Attorney, Agent, or Firm* — Henry M. Feiereisen LLC

(57) ABSTRACT

In a method for the start-up operation of a multi-axis system, with the multi-axis system including, as components, segments connected via respective joints and are movable in one or more axes, and a tool, connected to one of the segments and is movable to a specified position, optical markers are arranged in the environment. Position coordinates of the optical markers in a first, global coordinate system are ascertained and stored in the controller. The environment is captured as image data by a camera system. The image data are transmitted to an AR system and visualized in an output apparatus. The optical markers and virtual markers are represented during the visualization of the image data, wherein a respective virtual marker is assigned to an optical marker. A check is performed as to whether an optical marker and the virtual marker overlay one another in the visualized image data.

11 Claims, 1 Drawing Sheet

(51) Int. Cl.
  *B25J 9/16* (2006.01)
  *G06T 7/73* (2017.01)
  *G06T 7/60* (2017.01)
  *G06T 11/60* (2006.01)
  *H04N 5/232* (2006.01)
(52) U.S. Cl.
  CPC ............... *G06T 7/74* (2017.01); *G06T 11/60* (2013.01); *H04N 5/23296* (2013.01); *G05B 2219/32014* (2013.01); *G05B 2219/37009* (2013.01); *G05B 2219/39449* (2013.01); *G06T 2207/30204* (2013.01); *G06T 2207/30244* (2013.01); *G06T 2210/12* (2013.01)
(58) Field of Classification Search
  CPC ........ G06T 2207/30244; G06T 2210/12; B25J 9/1692; H04N 5/23296; G05B 2219/32014; G05B 2219/37009; G05B 2219/39449

USPC ....................................................... 382/106
See application file for complete search history.

(56) References Cited

U.S. PATENT DOCUMENTS

| 9,898,833 | B1 * | 2/2018 | Jankevics | G06T 7/62 |
| 2010/0161125 | A1 | 6/2010 | Aoba | |
| 2011/0313734 | A1 | 12/2011 | Grosch | |
| 2014/0200863 | A1 * | 7/2014 | Kamat | G01C 15/00 |
| | | | | 703/1 |

FOREIGN PATENT DOCUMENTS

| CN | 102301310 A | 12/2011 | | |
| CN | 103376080 A | 10/2013 | | |
| DE | 102005005242 A1 | 8/2006 | | |
| DE | 102009040848 A1 * | 4/2011 | ........... | G02B 27/017 |
| DE | 102009040848 A1 | 4/2011 | | |

* cited by examiner

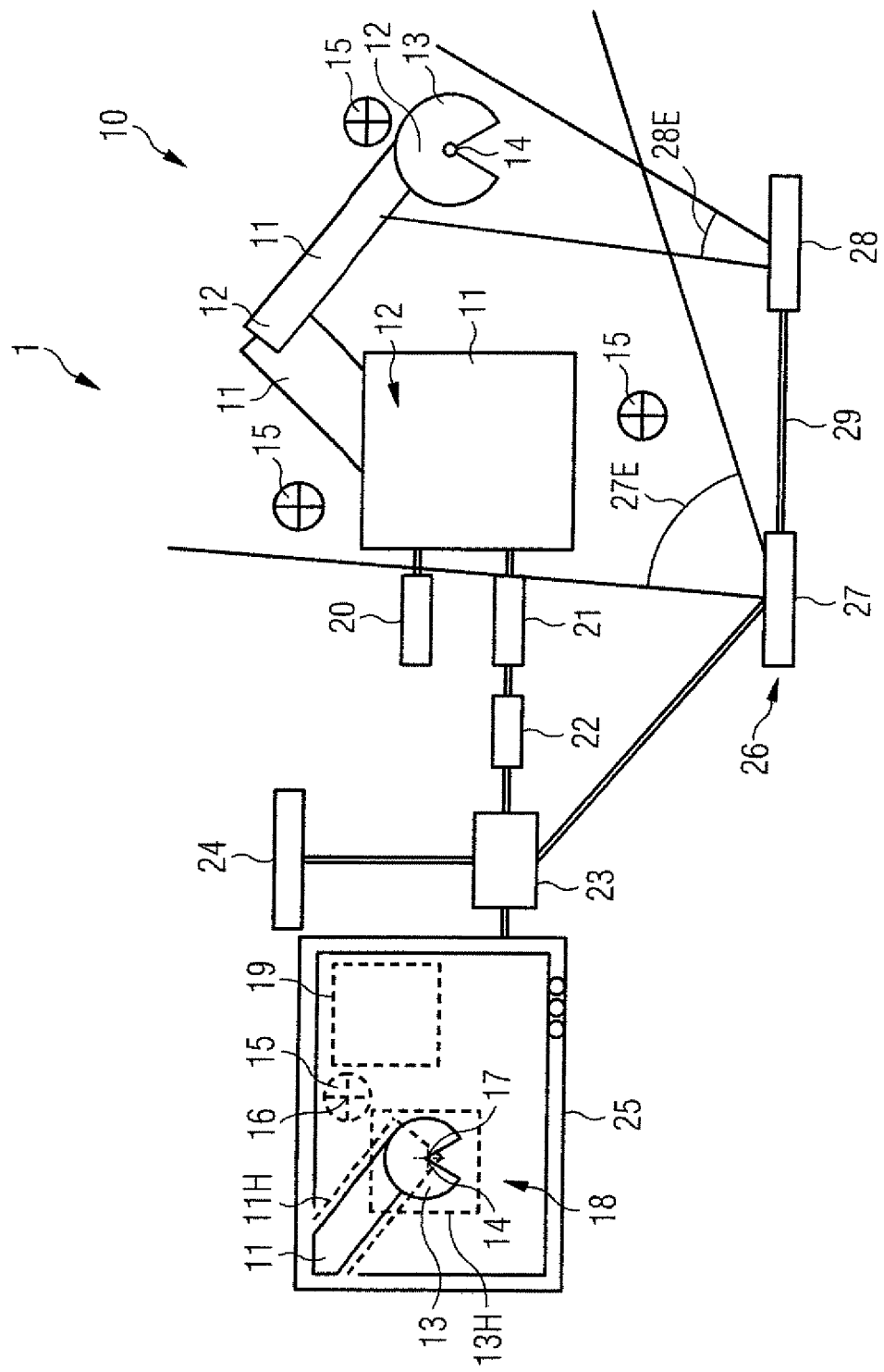

METHOD AND APPARATUS FOR THE START-UP OPERATION OF A MULTI-AXIS SYSTEM

CROSS-REFERENCES TO RELATED APPLICATIONS

This application claims the priority of European Patent Application, Serial 16199732.5, filed Nov. 21, 2016, pursuant to 35 U.S.C. 119(a)-(d), the disclosure of which is incorporated herein by reference in its entirety as if fully set forth herein.

BACKGROUND OF THE INVENTION

The invention relates to a method and an apparatus for the start-up operation of a multi-axis system.

The following discussion of related art is provided to assist the reader in understanding the advantages of the invention, and is not to be construed as an admission that this related art is prior art to this invention.

Multi-axis systems are universal, programmable machines for handling, assembling or machining workpieces. They are also referred to as (industrial) robots. They are designed for use in the industrial field. Once such a multi-axis system is programmed, it is capable of autonomously performing a work sequence or of varying, within limits, the performance of a task in dependence on sensor information.

The risks such multi-axis systems pose are due to the complex movement patterns and the great accelerations with simultaneously enormous forces that are frequently completely unpredictable for a person. Working beside an unsafe multi-axis system could therefore quickly result in severe injuries for a person located near the multi-axis system.

In order to prevent such accidents, safe monitoring of the position, position-dependent monitoring of the speed, of an acceleration and of the orientation of moving components of the multi-axis system are necessary. This is true in particular for work environments in which a multi-axis system is to cooperate with a person.

One prerequisite for the correct and safe function of such a multi-axis system is the definition of bounding bodies for the moving components and the correct definition of safe spaces and workspaces. Bounding bodies can have different geometric dimensions and shapes. Typically used bounding bodies are e.g. spheres, boxes or structures composed of a plurality of boxes. The definition of bounding bodies and the determination of safe spaces and workspaces permits cooperation between a multi-axis system and people, as long as it is certain that no bounding body of a component of the multi-axis system penetrates a safe space. If mistakes are made when defining these bodies, e.g. penetration of a bounding body into a safe space during running operation is not recognized, and therefore a safety function is erroneously not triggered.

Manually inputting coordinates, dimensions and orientation of the bounding bodies of the components of a multi-axis system into a program or database is known. In addition to a high manual effort, this procedure has the disadvantage that checking of the bounding bodies that are obtained from the input is susceptible to errors in reasoning and input. Another known possibility is that of defining safe spaces by moving the tool of the multi-axis system to the corners of all non-moving bodies, i.e. of the safe spaces and the workspace, while simultaneously capturing and storing corresponding coordinates. However, this variant is suitable only for bounding bodies of non-moving spaces, but not for bounding bodies of moving components of the multi-axis system.

Both above approaches operate in "point-orientated" fashion. A user defining the bounding bodies must therefore compose the bounding bodies in his or her mind from a plurality of points in the three-dimensional space. This requires great cognitive power and is therefore susceptible to errors. Moreover, it is not easy to identify whether a bounding body of a segment of the multi-axis system in fact actually completely contains said segment. A further problem is that it is impossible to readily determine whether a defined bounding body has been assigned to the correct segment of the kinematics of the multi-axis system. If this is not the case, said bounding body may in fact be located at the correct segment in the rest state, but upon movement follows e.g. another segment, and not the segment that is actually assigned to it.

It would be desirable and advantageous to provide an improved method and apparatus to obviate prior art shortcomings and to reliably permit start-up operation of a multi-axis system in computer-supported fashion.

SUMMARY OF THE INVENTION

According to one aspect of the present invention, a method for the start-up operation of a multi-axis system is proposed. The multi-axis system includes, as components, a number of segments and a tool. The number of segments are connected in pairs by respective joints and are movable in one or multiple axes by way of a controller. The tool is connected to one of the segments and is movable and drivable to a specified position by way of the controller. Assigned to the multi-axis system is a workspace in which a presence and/or a movement of the components of the multi-axis system is permitted. Furthermore, at least one safe space that the components are not permitted to penetrate is assigned to the multi-axis system.

In order to carry out a start-up operation of the multi-axis system, the following steps are performed: a plurality of optical markers are arranged in the environment of the multi-axis system. The position coordinates of the optical markers in a first, global coordinate system are ascertained and stored in the controller. The environment of the multi-axis system having the plurality of optical markers is captured in the form of image data by a camera system, which includes at least one camera. The image data of the camera system are transmitted to an augmented reality (AR) system and visualized in an output apparatus, wherein, in addition to the optical markers that are contained in the image data, virtual markers are represented during the visualization of the image data. One respective virtual marker is assigned to exactly one of the optical markers. The position of a respective virtual marker in the visualized image data is obtained from a transformation of the position coordinates of said assigned optical marker from the first, global coordinate system into a second coordinate system corresponding to a position and orientation of the camera system. The second coordinate system is thus a coordinate system of the camera system, wherein the axes thereof are aligned with the position and orientation of the camera system. Finally, a check is carried out as to whether an optical marker and the assigned virtual marker overlay one another in the visualized image data.

With the proposed method it becomes possible to check whether the AR system operates correctly. The AR system can thus be used to realize a functionally safe definition and check of bounding bodies and of the safe spaces and workspaces. Consequently, any errors occurring when defining the bounding bodies or when assigning a bounding body to a respective component of the multi-axis system can be simply and quickly determined due to the possibility of the visual check in the AR system. As a result, start-up operation of a multi-axis system is less susceptible to faulty reasoning.

Ascertaining the position coordinates of the plurality of optical markers can be performed in different ways.

In one variant, a TCP (tool center point) of the tool of the multi-axis system can be moved to a respective optical marker in order to ascertain the position coordinates of the optical marker. Next, the position coordinates of the TCP, which are known to the controller, are ascertained as the position coordinates of the optical marker and stored. The movement can be performed manually, in what is known as inching operation, or automatically. In an alternative variant, a mark that is applied onto the tool, in particular the TCP, and the just processed optical marker are captured by the AR system in order to ascertain the position coordinates of a respective optical marker. A distance between the mark and the optical marker is ascertained. The position of the tool is then iteratively changed until the distance is minimum. The position coordinates of the tool, in particular of the TCP, which are known to the controller, are ascertained as the position coordinates of the optical marker and stored.

The TCP is a known reference point that is imagined in the environment of multi-axis systems and is located at a suitable site on the tool. In order to describe which location the tool of the multi-axis system assumes, it is sufficient for the position and orientation of the TCP to be defined in the space, i.e. in the first, global coordinate system.

The second variant for ascertaining the position coordinates makes it possible for the position coordinates of the respective optical markers to be ascertained in automated fashion. Here, an iterative searching method can be used, in which the tool, or the TCP, is moved until the distance between the tool, or the TCP, and the currently observed optical marker becomes minimum. This procedure is repeated for all optical markers.

According to another advantageous feature of the present invention, a decision can be made in the step of checking for a correct calibration of the AR system as to when the optical marker and the associated virtual marker overlay one another in the visualized image data. The correct calibration of the AR system occurs in particular if the overlay of the optical marker and the assigned virtual marker is present independently of the angle with which the camera system records the environment of the multi-axis system. It is to be understood that the correct overlay here is given not only for an individual or selected optical marker and the assigned virtual marker, but for all optical markers and the assigned virtual markers thereof.

According to another advantageous feature of the present invention, a decision can be made in the step of checking for an error-containing calibration of the AR system as to when the optical marker and the associated assigned virtual marker do not or only partially overlay one another in the visualized image data. In particular, an offset, which is ascertained in the visualized image data, between the optical marker and the assigned virtual marker is used to ascertain the extent of the actual distance between the optical marker and the assigned virtual marker.

If there is no overlay of the optical marker and the assigned virtual marker, it is possible, in accordance with a further configuration, for a transformation rule for the transformation of the position coordinates from the first, global coordinate system into the second coordinate system to be adapted. This procedure can be iteratively repeated in particular until an overlay of the optical marker and the assigned virtual marker is present.

The step of checking can be performed in computer-supported fashion by way of an image processing program. It is likewise possible in a simple manner for a user, who performs the start-up operation of the multi-axis system, to identify on the basis of the output apparatus whether an overlay of the virtual marker and the assigned optical marker is present. In both cases, it is easily possible for the correct calibration of the AR system to be checked in this manner, which highly simplifies the start-up operation with respect to correctly defined bounding bodies, safe spaces and workspaces.

According to another advantageous feature of the present invention, provision can be made for position coordinates of a TCP of the tool of the multi-axis system to be converted from the first, global coordinate system into the second coordinate system, and for a virtual TCP, in addition to the TCP, to be represented in the visualized image data for the purposes of a check as to whether the TCP and the virtual TCP overlay each other in the visualized image data. This procedure makes possible the check as to whether the AR system has, during the later visualization of bounding bodies, a correct reference to the TCP of the multi-axis system.

According to another advantageous feature of the present invention, a mark can be arranged on each of the components, which mark is detectable in the visualized image data by way of image processing. For each of the components, one bounding body is defined and assigned thereto, wherein a bounding body that is assigned to a component encloses the assigned component, in particular completely. During a movement of the multi-axis system in space, the position of the bounding bodies in the first, global coordinate system is calculated and transformed into the second coordinate system corresponding to the position and orientation of the camera system, wherein the bounding bodies, which have been transformed into the second coordinate system, are visualized in the AR system together with the image that is recorded by the camera system and includes the mark of a respective component.

By evaluating the movement of a respective mark of the component and the movement of the assigned bounding bodies, a check can be carried out as to whether the bounding bodies follow their assigned components during the movement. It is thus possible to check with this configuration as to whether bounding bodies which are assigned to respective components continue to (permanently) bound said components even during a movement of the kinematics of the multi-axis system. By attaching the mark to individual components of the kinematics, this step can be performed in a computer-supported and automated fashion by means of image processing.

According to another aspect of the present invention, a computer program product which can be loaded directly into the internal memory of a digital computer and includes software code with which the steps according to the method described in this description can be performed, when the product runs on a computer. A computer within this meaning can be the totality of the described controller as well as the AR system.

According to still another aspect of the present invention, an apparatus for the start-up operation of a multi-axis system is proposed. The multi-axis system includes, as components, a number of segments and a tool. The number of segments are connected by way of respective joints and are movable in one or more axes. The tool is connected to one of the segments and is movable and drivable to a specified position.

The apparatus according to the present invention includes a controller for driving the components of the multi-axis system. The apparatus furthermore includes a camera system having at least one camera, which captures the multi-axis system from an environment and provides image data of the environment. The apparatus furthermore includes a plurality of optical markers in the environment of the multi-axis system, the position coordinates of which are stored in a first, global coordinate system in the controller. The apparatus finally includes an AR system that processes the image data captured by the camera system and visualizes them in an output apparatus which is set up to represent in the visualization of the image data, not only the optical markers contained in the image data, but also virtual markers, wherein a respective virtual marker is assigned to exactly one of the optical markers, and the position of a respective virtual marker in the visualized image data is obtained from a transformation of the position coordinates of the assigned optical marker from the first, global coordinate system into a second coordinate system corresponding to a position and orientation of the camera system. The AR system is furthermore set up to check whether an optical marker and the associated virtual marker overlay each other in the visualized image data.

The apparatus in accordance with the invention has the same advantages as were described previously in connection with the method in accordance with the invention. Moreover, the apparatus can comprise further means which enable it to perform the method described in this document.

BRIEF DESCRIPTION OF THE DRAWING

Other features and advantages of the present invention will be more readily apparent upon reading the following description of currently preferred exemplified embodiments of the invention with reference to the accompanying drawing in which the sole FIGURE shows a schematic illustration of an apparatus in accordance with the present invention for the start-up operation of a multi-axis system.

DETAILED DESCRIPTION OF PREFERRED EMBODIMENTS

The depicted embodiment is to be understood as illustrative of the invention and not as limiting in any way. It should also be understood that the FIGURE may not necessarily be to scale. In certain instances, details which are not necessary for an understanding of the present invention or which render other details difficult to perceive may have been omitted.

The sole FIGURE shows a schematic illustration of an apparatus 1 in accordance with the invention for the start-up operation of a multi-axis system 10. The multi-axis system 10 can be, for example, an industrial robot, a production or packaging machine, a CNC cutting machine, a loading crane or the like. However, a multi-axis system is also understood to mean a production cell having a plurality of such machines.

In the schematic illustration of the FIGURE, the multi-axis system 10 includes a number of segments 11 which are interconnected in pairs via a joint 12. Arranged at a free end of a last segment 11 is, by way of example, a tool 13 with a TCP (tool center point) 14. The tool position of the multi-axis system 10 is described by way of the TCP. The TCP is a reference point that is located at a suitable site on the tool 13.

The kinematics of the multi-axis system 10 are driven by a controller 20. The controller, e.g. a programmable logic controller (PLC), can be provided by a computational unit. Moreover, the multi-axis system 10 includes functionally safe sensors (not illustrated) for capturing the axial positions of the kinematics, i.e. of the individual segments 11 and joints 12. The values of the functionally safe sensors are read in by way of a functionally safe controller (referred to as F-SPS), on which a functionally safe program runs. Due to the functionally safe controller 21, the position of the TCP of the kinematics of the multi-axis system 10 can be calculated. The functionally safe controller 21 also calculates the current position of the kinematics bounding bodies in what is known as a world coordinate system. Said controller checks whether intersection between later-described bounding bodies and the safe spaces exists, or whether a bounding body leaves the workspace. The task of the functionally safe controller 21 is moreover to monitor for the maintenance of a maximum speed during manual operation of the multi-axis system which can be necessary for performing a method step during the start-up operation of the multi-axis system. If one of these cases occurs, a safety function is performed, i.e. the stopping of the kinematics.

Although in the exemplary embodiment shown the controller 20 and the functionally safe controller 21 are shown as separate components, the controller 20 and the functionally safe controller 21 can also be realized in the form of a single controller.

The apparatus includes a programming device 22, which is connected to the controller and/or to the functionally safe controller 21 in order to load a program or parameters into the controller 20 or the functionally safe controller 21 and in order to read out values calculated thereby.

The apparatus 1 moreover includes a camera system 26. The camera system 26 includes a first camera 27, which captures the environment of the multi-axis system 10. The image captured by the first camera 27 is used to ascertain the position of the camera system and to orientate the camera system 26. The camera system 26 moreover includes an optional second camera 28. The optional second camera 28 serves for recording a specific section (in this description also referred to as a scene). If, in addition to the first camera 27, the camera system also includes the optional second camera 28, both are connected to each other by way of a rigid connection 29. As a result, the position and orientation of the first and of the second camera 27, 28 relative to one another is known. The use of two cameras 27, 28, as shown in this exemplary embodiment, permits observation of the scene from different angles. In the present exemplary embodiment, a capturing region of the first camera 27 is designated 27E, and a capturing region of the second camera 28 is designated 28E. It can easily be seen that the capturing region 27E captures the multi-axis system 10 in its entirety, while the capturing region 28E of the second camera 28 is selected such that in particular the tool 13 and part of the segment 11 holding the tool 13 are captured. The use of a second camera moreover reduces the risk of parts of the multi-axis system 10 being obscured.

The apparatus 1 moreover includes an AR system 23, which reads in the image captured by the first camera 27 and ascertains the position of the first camera 27, or of the pair of cameras, by evaluating the image information. The image of the second camera 28 and information from the functionally safe controller 21 are likewise read in by the AR system, combined with each other and transmitted to an output apparatus 25 for visualization.

The AR system 23 can be realized in the form of software and be executed on the programming device 22. Alternatively, the AR system 23 can be realized, as shown, as an independent component. In this case, a communication link to the programming device 22 exists.

An output apparatus 25, which in the present exemplary embodiment displays the image captured by the second camera 28, is connected to the AR system 23. In addition, defined bounding bodies which will be described in more detail below are overlaid by the AR system 23 on the components visible in the shown image section (here a segment 11 and the tool 13). The output apparatus 25 can be a computer, such as e.g. a PC, a laptop, a tablet, a smartphone, but also AR glasses and any other device for representing two-dimensional or three-dimensional images. In order to identify errors in the output apparatus 25, it is also possible to use diverse output apparatuses, e.g. one during the definition of the bounding bodies that will be described in more detail below, and another during the check.

In an alternative configuration, the first and the second camera 27, 28, the output apparatus 25 can be combined with the AR system 23 in a common device.

A number of markers 15 are distributed in the environment of the multi-axis system 10. Three such markers 15 are shown merely by way of example in the illustration of FIG. 1. The markers 15 can be optical markers, e.g. stickers, but also objects having a specific shape and/or color. However, edges and/or corners or other pronounced constituent parts of the multi-axis system 10 and/or of the environment of the multi-axis system can also generally be used as optical markers 15. It is advantageous if the markers 15 are arranged uniformly in space. By way of the markers 15, it is possible for the AR system 23 to perform exact position determination and ascertainment of the position and orientation of the camera system 26. If the AR system does not require markers for the position determination, because other components and/or technical units are used for the position determination, the markers 15 do not need to be optically capturable by the camera system 26.

The functionally safe definition and checking of bounding bodies and of safe spaces and workspaces is achieved by way of the method that is described in more detail below.

In a first step, a plurality of the markers 15 are arranged at suitable sites, which allow the AR system 23 to perform exact localization of the camera system 26. The sites where the markers 15 are placed are selected such that the markers 15 are capturable from as many viewing angles for the camera system 26 as possible.

In the next step, the position of the markers 15 in a global coordinate system of the kinematics of the multi-axis system 10 is ascertained. This is done e.g. by way of the TCP 14 of the tool 13 being moved onto a respective marker 15 and the position being confirmed by way of the input device 24. By way of a functionally safely implemented and performed forward transformation of the functionally safe controller 21, the Cartesian coordinates of the relevant marker 15 can be reliably ascertained. The markers 15 are thus ascertained in the global coordinate system of the multi-axis system 10.

Moving the TCP onto a respective marker 15 can be performed for example manually, in what is referred to as inching operation. The moving of the TOP onto a relevant marker can also be done automatically. To this end, a mark is applied on the TCP 14 of the tool 13, with the result that the AR system 23 is enabled to calculate the distance of the TCP 14 from the respective markers 15. For any given marker 15, the segments 11 of the multi-axis system are moved as part of a searching method until this distance becomes minimum. This procedure is repeated for all markers 15.

In a further alternative procedure of the automated operation, it is possible to realize the attachment of a laser rangefinder with radio interface (not illustrated) on the TCP 14. The AR system 23 recognizes the laser spot on the camera image, e.g. by switching on/off a laser of the rangefinder and observing the pixels in the camera image. The AR system 23 likewise identifies the marker 15 and calculates the distance between the laser spot and the relevant marker 15. Here, the AR system 23 reads the measured distance from the rangefinder per radio link and combines it with the coordinates of the TCP from the controller 20 of the multi-axis system 10. The controller 20 subsequently moves the kinematics of the multi-axis system 10 in accordance with the calculated distance until the laser spot is overlaid by the marker 15.

This procedure is performed until all markers 15 in the coordinate system of the multi-axis system 10 have been measured.

In a next step, the position coordinates of the markers 15 are transmitted from the functionally safe controller 21 into the AR system 23. The AR system 23 is thus enabled to deduce the position and direction of the camera system in the global coordinate system from a moving image of the camera system 26 that contains the markers 15.

Subsequently, a check is carried out as to whether the AR system 23 operates correctly, i.e. the information output in the output apparatus 25 is correctly displayed. This check is performed by way of the AR system 23 overlaying a respectively assigned virtual marker 16 on the marker 15 in the image of the output apparatus 25. The virtual marker or markers 16 and the actual marker or markers 15, which is/are assigned to the former, are displayed together with the image captured by the camera system 26 on the output apparatus 25. During correct functioning of the AR system 23, the real markers 15 must be congruent with the assigned virtual markers 16. This must be true independently of the angle from which the markers 15 are recorded by the camera system 26.

Moreover, the AR system 23 reads the position of the TCP calculated by the functionally safe controller 21 and displays a virtual TCP 17 in the output apparatus 25. The virtual TCP must be congruent with the actual TCP 14, independently of the position at which the camera system 26 and the TCP 24 are located.

The check can be performed in automated fashion and in computer-supported fashion by way of an image processing program. If e.g. the virtual markers 16 consist of yellow circles, while the physical markers 15 have a blue color, all blue pixels on the image of the output apparatus 25 must be enclosed by a yellow parameter. Conversely, only blue pixels must be located within the yellow circles. The check is performed in the pixel-level in the two-dimensional image of the output apparatus 25.

Moreover, it is possible to ascertain in computer-supported fashion to which real distance a pixel offset corresponds, if a marker 15 and an assigned virtual marker 16 do not completely overlay one another. If the error is negligible, which can be done e.g. by a visual check by a user or in computer-supported fashion by image processing, the check can be accepted. This can be done using a dedicated input command via an input device. If not, it is necessary to decide manually or in computer-supported fashion whether recalibration is necessary, i.e. whether a transformation rule is necessary for the transformation of position coordinates from the first, global coordinate system into the second coordinate system.

If the previously captured markers 15 are not sufficient for ascertaining the position and direction of the camera system 26, because for example not all markers 15 or not a sufficient number of markers 15 are visible from all the necessary viewing angles, further temporary markers can be arranged in the environment of the multi-axis system 10. The position of the temporary markers (not illustrated) can be ascertained by the AR system 23 using the previously existing markers 15. Calibration of the temporary markers can be performed by way of providing corresponding visual markers which, as is described above, are overlaid in the AR system with the temporary markers. Instead of temporary markers, it is also possible to use already existing reference points, e.g. corner points of unmoving objects or the like, as temporary markers.

In a next step, the bounding bodies for the components (segments 11, joints 12, tool 13) of the multi-axis system 10 are defined.

Supporting points of the bounding bodies 11H, 13H are defined using a (e.g. user-guided) auxiliary marker and the input device. For example, a bounding body 11H, 13H can be in the shape of a box that is defined by a number of corner points. If the bounding body is a sphere, the sphere can be defined by at least three points on the sphere surface. A user holds the auxiliary marker to the desired position of a supporting point and activates the input device. This prompts the AR system 23 to calculate the position of the auxiliary marker. The calculation is performed on the basis of the image data and of the markers 15 that are contained in the image data and whose position in the first, global coordinate system is known. If all supporting points for a bounding body 11H, 13H have been input, the bounding body 11H, 13H is calculated and stored in the functionally safe controller 21. This is repeated for all the components of the multi-axis system 10. When defining the bounding bodies 11H, 13H, care should be taken that a respective bounding body 11H, 13H, which is assigned to a component, i.e. segment 11 or tool 13, respectively, encloses the component around its entire parameter.

Alternatively, the type and dimension of a bounding body can be defined, e.g. box, sphere or the like. The bounding body is then placed interactively via the input device and monitoring by the output apparatus by moving the auxiliary marker to the corresponding position and orientation. The input device 24 is used to confirm the correct position and orientation. Dimension, position and orientation of the placed bounding body can be subsequently adapted in a similar manner, until the desired accuracy is achieved.

Once all bounding bodies have been defined, the bounding bodies are divided into safe spaces, workspaces and bounding bodies. The bounding bodies are assigned to the individual components (segments 11, tool 13, joints 12) of the kinematics of the multi-axis system 10. It is to be understood that the one or more safe spaces and workspaces can have been set up as part of the definition of the bodies or been previously set up.

Checking the defined bounding bodies 11H, 13H is performed by way of the functionally safe controller 21 calculating the position of the bounding bodies possibly in dependence on current positions of the components 11, 13 of the multi-axis system 10. The AR system 23 reads in the current position and orientation of the bounding bodies 11H, 13H and of the safe space 19 from the functionally safe controller 21. Subsequently, the AR system 23 transforms the bounding bodies 11H, 13H or the safe space 19 corresponding to the position and orientation of the camera system 26. The bounding bodies 11H, 13H and the workspace or workspaces 18 and the safe space or safe spaces 19 are overlaid with the actual image of the camera system 26 and are represented on the output apparatus 25. The workspace is shown merely schematically with the reference sign 18. FIG. 1 illustrates the bounding bodies 11H for the segment 11 and 13H for the tool 13 both in the form of boxes. Merely by way of example, a safe space 19 is visualized, by way of example in the form of a box. During a movement of the kinematics of the multi-axis system 10, the bounding bodies, presupposing their correct definition, follow the respective components of the multi-axis system 10. It is then possible to check using the AR system whether the previously defined and stored bounding bodies, safe spaces and workspaces match reality. It would be an error e.g. if a bounding body is too small and part of the multi-axis system is not bounded. This check can be performed manually, i.e. by viewing the augmented camera image. Alternatively, the check can also be performed automatically. For example, if the multi-axis system is painted orange, but the overlaid bounding bodies are colored blue in the visualization, no more blue pixels are allowed to appear in the augmented image. This check can be performed using image recognition software.

The check whether a bounding body 11H, 13H, which is assigned to a component, follows the assigned component of the kinematics during a movement, can be automated. This can be achieved by attaching special marks (not illustrated) to the individual components or members of the kinematics of the multi-axis system 10. As a result, the AR system 23 is enabled to directly capture the movement of the individual members of the kinematics and compare it to the movement of the bounding bodies.

If necessary, the camera system 26 can be moved to observe the bounding bodies 11H, 13H and the workspace or workspaces and/or safe space or spaces 18, 19 from different viewing angles.

If the AR system 23 can exactly localize the position and orientation of the camera system 26 even without markers 15, then the arrangement of the markers 15 and the calibration thereof and transmission of position coordinates to the AR system 23 can be dispensed with. This is possible for example if it is possible, merely by analyzing the image of the camera system 26 or using special sensors which are installed for example on or in the camera system 26, to localize the position and orientation of the camera system.

For a given multi-axis system, e.g. a 6-axis robot, a step-by-step process can be determined, which guides through the definition of the bounding bodies. In this way, it is not possible to forget a component of the multi-axis system.

What is claimed as new and desired to be protected by Letters Patent is set forth in the appended claims and includes equivalents of the elements recited therein:

What is claimed is:
1. A method for the start-up operation of a multi-axis system, with the multi-axis system including, as components, a plurality of segments which are connected via respective joints and are movable by a controller in one or more axes, and a tool which is connected to one of the segments and is movable and drivable to a specified position by the controller, said method comprising:
arranging a plurality of optical markers hi the environment of the multi-axis system;

ascertaining position coordinates of the optical markers in a first, global coordinate system;

storing the position coordinates of the optical markers in the controller;

recording the environment of the multi-axis system in the form of image data by a camera system, which camera system comprises a camera;

transmitting the image data of the camera system to an augmented reality (AR) system;

assigning a virtual marker to an optical marker;

obtaining a position of the virtual marker from a transformation of the position coordinates of the assigned optical marker from the first, global coordinate system into a second coordinate system corresponding to a position and orientation of the camera system;

visualizing the image data, which contains the optical markers and the virtual markers, in an output apparatus;

checking whether the optical marker and the assigned virtual marker overlay one another in the visualized image data;

detecting in the visualized image data a mark arranged on each component;

defining and assigning a bounding body to each component such that it encloses the assigned component;

calculating a position of the bounding body in the first, global coordinate system as the multi-axis system moves;

transforming the position of the bounding body into a second coordinate system commensurate with the position and orientation of the camera system;

visualizing the bounding bodies, which have been transformed into the second coordinate system, in the AR system together with an image that is recorded by the camera system and comprises the mark of a respective component; and checking, by evaluating the movement of a respective mark of the component and the movement of the assigned bounding bodies, whether the bounding, bodies follow the movement of their assigned component during the movement.

2. The method of claim 1, wherein a correct calibration of the AR system is determined during the step of checking, when the optical marker and the assigned virtual marker overlay one another in the visualized image data.

3. The method of claim 1, wherein an incorrect calibration of the AR system is determined during the step of checking, when the optical marker and the assigned virtual marker do not or only partially overlay one another in the visualized image data.

4. The method of claim 3, further comprising:
ascertaining an offset between the optical marker and the assigned virtual marker in the visualized image data; and
ascertaining the extent of an actual distance between the optical marker and the assigned virtual marker.

5. The method of claim 1, further comprising adapting a transformation rule for the transformation of the position coordinates from the first, global coordinate system into the second coordinate system, when the optical marker and the assigned virtual marker do not overlay one another.

6. The method of claim 5, wherein the step of adapting a transformation rule is executed in iterative steps.

7. The method of claim 1, wherein the step of checking is performed by an image processing program running on a computer.

8. The method of claim 1, further comprising:
converting position coordinates of a tool center point (TCP) of the tool of the multi-axis system from the first, global coordinate system into the second coordinate system;
representing the TCP and a virtual TCP in the visualized image data; and
checking whether the TCP and the virtual TCP overlay one another in the visualized image data.

9. The method of claim 1, wherein the bounding body completely encloses the component.

10. A computer program for the start-up operation of a multi-axis system, said computer program being embodied in a non-transitory computer readable medium, wherein the computer program comprises software code, which when loaded into an internal memory of a digital computer causes execution of the steps of:

arranging a plurality of optical markers in the environment of the multi-axis system;

ascertaining position coordinates of the optical markers in a first, global coordinate system;

storing the position coordinates of the optical markers in the controller;

recording the environment of the multi-axis system in the form of image data by a camera system, which camera system comprises a camera;

transmitting the image data of the camera system to an augmented reality (AR) system;

assigning a virtual marker to an optical marker;

obtaining a position of the virtual marker from a transformation of the position coordinates of the assigned optical marker from the first, global coordinate system into a second coordinate system corresponding to a position and orientation of the camera system;

visualizing the image data, which contains the optical markers and the virtual markers, in an output apparatus;

checking whether the optical marker and the assigned virtual marker overlay one another in the visualized image data;

detecting in the visualized image data a mark arranged on each component;

defining and assigning a bounding body to each component such that it encloses the assigned component;

calculating a position of the bounding body in the first, global coordinate system as the multi-axis system moves;

transforming the position of the bounding body into a second coordinate system commensurate with the position and orientation of the camera system;

visualizing the bounding bodies, which been transformed into the second coordinate system, in the AR system together with an image that is recorded by the camera system and comprises the mark of a respective component; and checking, by evaluating the movement of a respective mark of the component and the movement of the assigned bounding bodies, whether the bounding bodies follow the movement of their assigned component during the movement.

11. An apparatus for the start-up operation of a multi-axis system, with the multi-axis system including, as components, a plurality of segments which are connected via respective joints and are movable by a controller in one or more axes, and a tool which is connected to one of the segments and is movable and drivable to a specified position by the controller, comprising:

a controller for driving the components of the multi-axis system;

a camera system configured to record the multi-axis system in an environment of the multi-axis system and to provide image data of the environment;

a plurality of optical markers in the environment of the multi-axis system, position coordinates of which are stored in a first, global coordinate system in the controller;

an augmented reality (AR) system configured to process the image data recorded by the camera system and to visualize the image data; and an output apparatus operably connected to the augmented reality (AR) system for visualizing the virtual data, said output apparatus configured to represent in the visualization of the image data the optical markers and virtual markers which are contained in the image data and assigned to the optical markers in one-to-one correspondence, with a position of each of the virtual markers in the visualized image data being obtained from a transformation of the position coordinates of the assigned one of the optical markers from the first, global coordinate system into a second coordinate system corresponding to a position and orientation of the camera system, and check whether an optical marker and the assigned virtual marker overlay each other in the visualized image data, wherein a mark is arranged on each of the components, which mark is detectable in the visualized image data by way of image processing;

for each of the components, one bounding body is defined and assigned thereto, wherein a bounding body that is assigned to a component encloses the assigned component completely;

during a movement of the multi-axis system in space, the position of the bounding bodies in the first, global coordinate system is calculated and transformed into the second coordinate system corresponding to the position and orientation of the camera system, wherein the bounding bodies, which have been transformed into the second coordinate system are visualized on the output apparatus together with the image that is recorded by the camera system and comprises the mark of a respective component;

by evaluating the movement of a respective mark of the component and the movement of the assigned bounding bodies it is checked whether the bounding bodies follow their assigned component during the movement.

* * * * *